United States Patent
Dohn

[11] Patent Number: 5,618,604
[45] Date of Patent: Apr. 8, 1997

[54] BALSA CORE LAMINATE HAVING BEVELLED EDGES

[76] Inventor: George D. Dohn, 24 Colony Ave., Park Ridge, N.J. 07656

[21] Appl. No.: 528,991

[22] Filed: Sep. 15, 1995

[51] Int. Cl.[6] ................................................ B32B 3/02
[52] U.S. Cl. ................................................ 428/72; 428/192
[58] Field of Search .............................. 428/192, 68, 72; 156/60

*Primary Examiner*—Alexander Thomas
*Attorney, Agent, or Firm*—Michael Ebert

[57] ABSTRACT

A structural laminate in which an end-grain balsa core panel is sandwiched between and adhered to facing skins that cover the edges of the panel as well as its opposing faces. To make it possible for facing skins that cannot be sharply bent to conform to edges of the panel, these edges are bevelled to impart a gentle slope thereto. Bevelling is effected by means of a high-pressure die whose angled face has a staircase formation defined by a series of right-angle microsteps. When the die is forced against a right angle edge of the core panel to be bevelled with a pressure exceeding the compressive strength of the balsa, each microstep then imposes pressure in a direction parallel to the axes of the cluster of internal balsa cells engaged by the microstep to more or less collapse this cluster to an extent depending on the staircase position of the microstep, thereby densifying the internal structure of the balsa at the edge of the panel without disintegrating this structure.

7 Claims, 2 Drawing Sheets

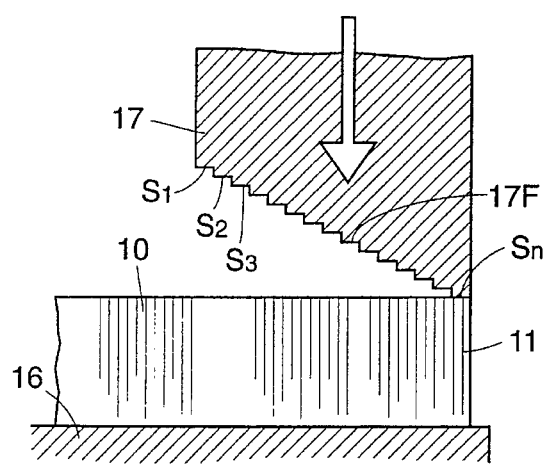
FIG. 5
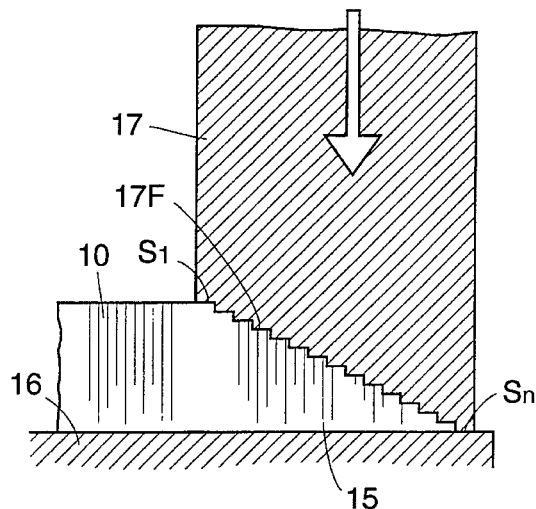
FIG. 6
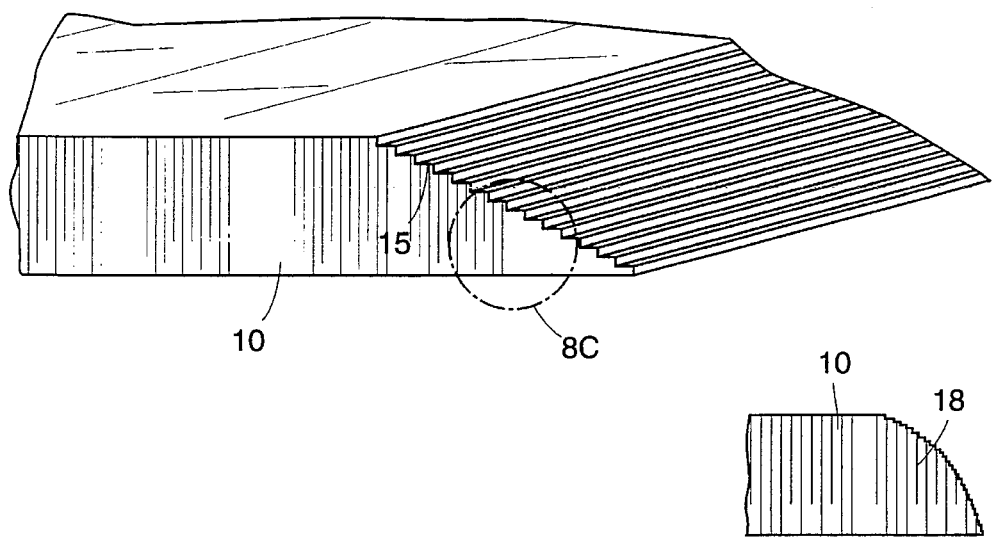
FIG. 7
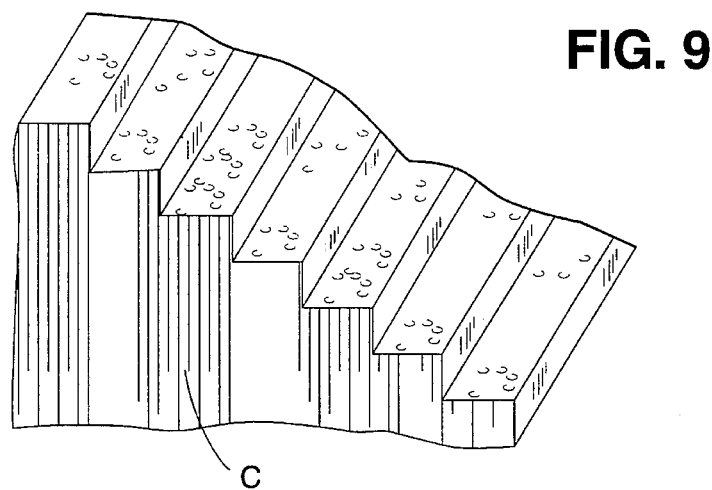
FIG. 8
FIG. 9

BALSA CORE LAMINATE HAVING BEVELLED EDGES

BACKGROUND OF INVENTION

1. Field of Invention

This invention relates generally to a structural laminate in which an end-grain balsa core panel is sandwiched between facing skins, and more particularly to a laminate of this type in which edges of three core panels are bevelled and in which the facing skins fully cover these edges as well as the opposing faces of the core panel.

2. Status of Prior Art

Balsa has outstanding properties unique in the field of lumber, for on the average it weighs less than nine pounds per cubic foot, this being 40% less than the lightest North American species. Its cell structure affords a combination of high rigidity and compressive and tensile strength that is superior to any composite or synthetic material of equal or higher density. Balsa is dimensionally stable and may be processed by standard woodworking techniques.

It is known that end-grain balsa wood, because of its high compressive strength, is capable of supporting far greater loads than flat-grain material of the same density, and that low-density balsa in the end-grain direction will support greater loads than flat-grained material of higher density. The cellular structure of balsa is such that the number of cells per cubic foot is extremely high, the wall thickness of each cell being quite thin. The cells are effectively independent of each other, each cell being comparable to an independent column or fiber. The cells of balsa wood are substantially parallel to each other.

Structural sandwich laminates can be created by bonding thin facings or skins to balsa wood panels which function as a core. Thus the Kohn et al. U.S. Pat. No. 3,325,037 and the Lippay U.S. Pat. No. 3,298,892 disclose structural sandwich laminates whose core is formed of end-grain balsa. The resultant laminates having a remarkably high strength-to-weight ratio as well as excellent thermal and acoustic insulation properties.

Of particular prior art interest is the Kohn U.S. Pat. No. 4,343,846 which discloses a structural laminate in which an end-grain panel is laminated to composite facing sheets formed by synthetic plastic films reinforced by glass fibers.

End-grain balsa-core sandwich laminates are widely used in transportation and handling equipment, such as for floors of railroad cars, shipping containers, cargo pallets, bulkheads, doors and reefer bodies, as well as in a variety of other applications. These laminates are also employed for structural insulation in aircraft applications, in housing and in boating.

While it is known to use thin metal facings or plastic skins in structural laminates having an end-grain balsa core, in recent years it has become the practice to enhance the strength of the laminate by means of composite facing skins reinforced by carbon or graphite fibers. Also in use are facing skins made of Kelvar, a synthetic plastic of exceptionally high strength.

For many installations, such as in automotive flooring applications, it is essential that the facing skins laminated to the end grain balsa core not only cover opposing faces of the panel, but also its edges so that these edges are protectively shielded and not exposed.

Composite facing skins which incorporate relatively stiff reinforcing fibers, though flexible, cannot be sharply bent. Should, therefore, one seek to bend a composite facing skin placed on a face of a core panel so as to conform to a right-angle edge of this panel, the skin cannot be fully bent. As a consequence, an air pocket will be created between the edge and the bent skin which introduces an unacceptably weak point in the structural laminate.

It therefore becomes desireable to bevel the edges of the end-grain balsa core panel to impart a gentle slope thereto. This slope makes it possible to laminate a facing skin which cannot be sharply bent yet can be made to fully conform to the gentle slope of the core panel and leave no air pocket.

Though one may bevel the edges of the panel by means of a router machine having a rapidly revolving spindle and a cutter, the use of this machine for this purpose has serious drawbacks. A milling operation of this sort is difficult to perform and is time consuming, thereby adding substantially to the cost of producing the structural laminate. Moreover, milling of the end grain balsa core edges disintegrates the wood and yields balsa waste, giving rise to pollution problems in the production plant.

SUMMARY OF INVENTION

In view of the foregoing, the main object of this invention is to provide a structural sandwich laminate in which an end-grain balsa core panel having bevelled edges is sandwiched between facing skins that cover these edges as well as the opposing facing of the panel.

More particularly, an object of this invention is to provide a technique for bevelling the edges of the end-grain balsa core panel so as to impart a gentle slope thereto which makes it possible for composite facing skins which cannot be sharply bent to fully conform to the edges of the core panel and leave no air pockets.

A significant advantage of a structured laminate in accordance with the invention is that it can be produced at relatively low cost, for bevelling of the edges is quickly effected by a die-stamping operation that imparts a gentle slope thereto which densifies the edges without disintegrating the structure of the balsa and producing balsa waste.

Briefly stated, these objects are attained by a structural laminate in which an end-grain balsa core panel is sandwiched between and adhered to facing skins that cover the edges of the panel as well as its opposing faces. To make it possible for facing skins that cannot be sharply bent to conform to edges of the panel, these edges are bevelled to impart a gentle slope thereto. Bevelling is effected by means of a high-pressure die whose angled face has a staircase formation defined by a series of right-angle microsteps. When the die is forced against a right angle edge of the core panel to be bevelled with a pressure exceeding the compressive strength of the balsa, each microstep then imposes pressure in a direction parallel to the axes of the cluster of internal balsa cells engaged by the microstep to more or less collapse this cluster to an extent depending on the staircase position of the microstep, thereby densifying the internal structure of the balsa at the edge of the panel without disintegrating this structure.

BRIEF DESCRIPTION OF DRAWINGS

For a better understanding of the invention as well as other objects and further features thereof, reference is made to the following detailed description to be read in conjunction with the accompanying drawings, wherein:

FIG. 5 schematically illustrates a high-pressure die having an angled face in accordance with the invention for imparting a gentle slope to the right-angle edge of a conventional end grain balsa core panel; the die being shown at a position directly above the edge;

FIG. 6 schematically shows the die pressed down against the right angle edge to impart a gently-sloped stepped bevel thereto;

FIG. 7 is a perspective view of the bevelled edge of the core panel;

FIG. 8 is a magnified view of the portion of the stepped bevel which lies within circle 8C in FIG. 7, and FIG. 9 illustrates a modified form of a stepped bevelled edge.

DETAILED DESCRIPTION OF INVENTION

The Structural Laminate

In a structural laminate in accordance with the invention in which an end-grain balsa core panel is adhesively laminated between facing skins, the edges of the core panel are microstep-bevelled to impart a gentle slope thereto so that a facing skin which cannot be sharply bent can be made to fully conform to these edges. By the term microstep-bevelled is meant a bevel which does not have a planar surface, but a surface having a staircase formation defined by a series of very small right angle steps. Hence this bevel cannot be produced by a router or other milling machine.

Figure 1:
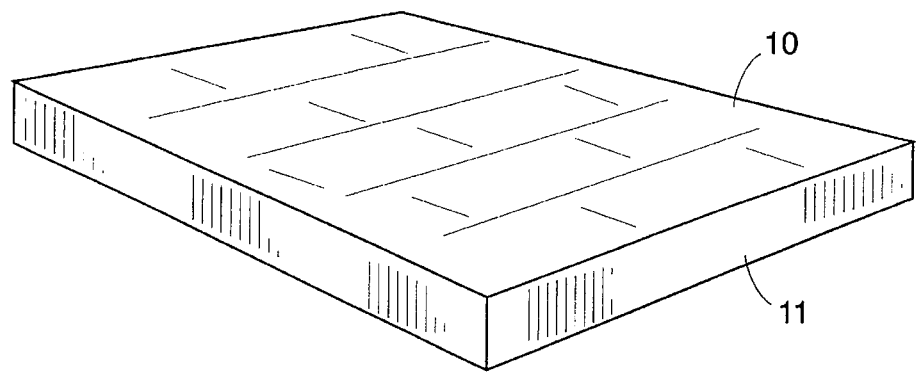
FIG. 1 is a perspective view of a conventional end-grain balsa core panel having right-angle edges.

FIG. 1 illustrates a standard end-grain balsa core panel 10 having right angle edges 11 and therefore unsuitable for use in producing a structural laminate in accordance with the invention. In order to render this panel usable for producing a laminate in accordance with the invention, its edges must be microstep-bevelled in the manner to be later described.

Commercial balsa wood is normally kiln-dried to reduce its moisture content to about 10 to 12%. The steps necessary to kiln-dry wood and the recommended practices therefor are set out in Publication #188 of the U.S. Department of Agriculture Forest Service, Forest Products Laboratory. However, if kiln-dried wood is stored in a humid temperature, its moisture content may rise substantially. In any case, even if the balsa wood to which skin is to be laminated has a moisture content of no more than 10%, because of hot curing necessary for a preferred epoxy adhesive, the heat will volatilize the moisture and the resultant vapors will interfere with effective lamination. Hence to effect lamination with an adhesive that requires hot curing, prior to lamination to facing skins, the panel must first be kiln-dried to a moisture content of about 2 to 3%.

Figure 2:
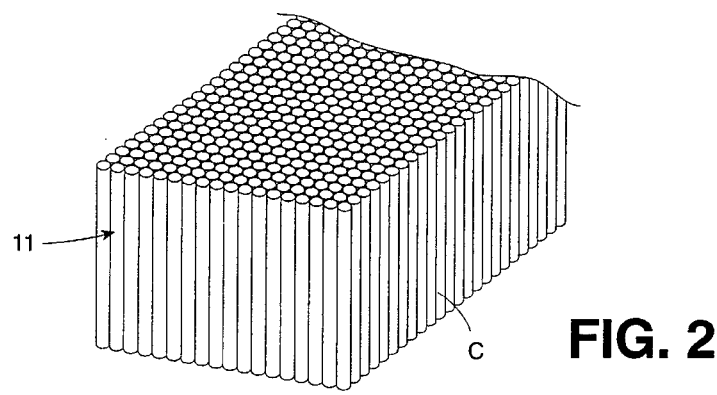
FIG. 2 is a magnified view of the vertical cells forming the internal structure of the end grain balsa.

The cellular internal structure of end grain balsa, as shown in FIG. 2, is composed of vertical cells C each having a thin wall, the number of cells per cubic foot being extremely high. The cells are effectively independent of each other, each being comparable to an independent column or fiber. The cells C are substantially parallel to each other.

Figure 3:
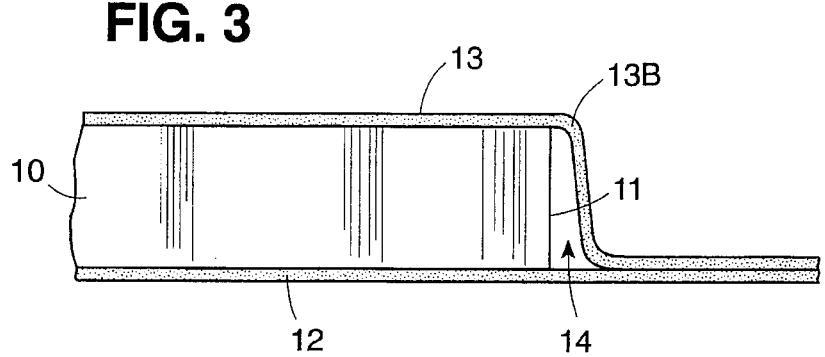
FIG. 3 is a sectional view of composite skins laminated to a conventional core panel having right angle edges to form a structural laminate.

If, as shown in FIG. 3, balsa core panel 10 having a right-angle edge 11 is laminated to upper and lower composite facing skins 12 and 13 which extend beyond right angle edge 11, and the upper skin 13 were bent down to cover edge 11, because of the strong stiff fibers included in the skin it could not be bent around this sharp edge. As a consequence though skin 13 could then be adhesively laminated to the upper face of core panel 10, it could not conform to and be adhesively laminated to edge 11, for the skin would rupture at the bend 13B and there would be created an entrapped air pocket 14 between the edge and the upper skin 13. This region would constitute a weak point in the structural laminate.

Figure 4:
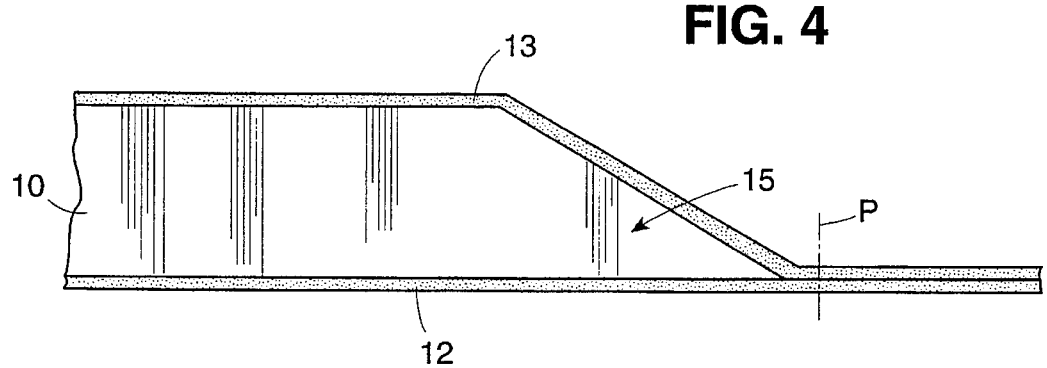
FIG. 4 is a section taken through a structural laminate in accordance with the invention in which an edge of the core panel is bevelled and the facing skins conform thereto.

In a structural laminate in accordance with the invention, as shown in FIG. 4, each right angle edge of the end grain balsa core panel is microstep-bevelled to provide a gently-sloped edge 15, preferably a slope of about 45 degrees. Hence the upper composite skin 13 adhesively laminated to the upper face of core panel 10 may be bent to fully conform and adhere to the sloped edge 15 of the core panel to provide a high-strength laminate free of air pockets and other points of weakness, the core panel being encased in the facing skins.

The portions of the interlaminated lower and upper facing skins 12 and 13 which extend beyond the bevelled edge 15 may be severed in a vertical plane P adjacent the triangular apex of the bevelled edge or in a plane spaced from this apex to form a laminate having a marginal flange.

Microstep Bevelling

As shown in FIG. 5, in order to impart a microstep bevel to each right-angle edge 11 of a standard end-grain core panel 10 to render it suitable for producing a structural laminate in accordance with the invention, the panel is placed on the horizontal platen 16 of a high-pressure die press. The press is provided with a hydraulically-operated die 17 formed of stainless steel or other high-strength material having an angled face 17F whose angle has the desired gentle slope.

Face 17F of the die is machined to create a surface having a staircase formation defined by a series of small right-angle microsteps $S_1$ to $S_n$. When, as shown in FIG. 6, die 17 is forced down to engage the right-angle edge 11 of the balsa core panel and subjects this right-angle edge to pressure that is higher than the compressive strength of the end-grain balsa, then the right-angle edge of the balsa is bevelled to conform to the shape of the die face. In practice, the die pressure may be in excess of 1500 PSI.

Each right-angle microstep in the angled face 17F of die 17 imposes a pressure only on that cluster of parallel balsa cells or columns which are engaged by the microstep. This pressure is applied in a direction parallel to the parallel axes of the columnar cells in this cluster.

Thus, as shown in FIGS. 7 and 8, the pressure applied by each microstep in the die face acts to collapse and densify the cluster of cells engaged thereby to an extent that depends on the position of the microstep in the staircase. The highest step $S_1$ in the die staircase only slightly collapses the cluster of cells engaged thereby, while the lowermost step $S_n$ effects a maximum collapse of the cluster of cells engaged thereby.

Because the pressure applied by each die microstep is in a direction parallel to the parallel axes of the cluster of cells engaged thereto and these cells are effectively independent of each other, the collapse and densification of these cells does not disintegrate the internal structure of the balsa. Hence no balsa waste results from this die stamping operation.

As shown in FIGS. 7 and 8, the bevelled edge 15 of the balsa core panel has the desired gentle slope and its sloped surface has a staircase formation corresponding to the staircase surface on the face of the die.

In practice, both the long and short right angle edges of a rectangular core panel, or either the long edges or the short edges can be quickly bevelled in the manner described above to render the core panel suitable for lamination to facing skins.

Modifications

It is not essential to the invention that the staircase formation impressed on the right-angle edge of an end-grain core panel run in a straight line, as shown in FIGS. 5 to 8. Thus the die may have an angled face whose staircased surface runs along a curved line to produce when the die is pressed down against the right angle edge of the core panel, a cove-contoured bevelled edge 18, as shown in FIG. 9.

Bevelled edge 18 has a gentle slope that runs along a curved line, thereby avoiding the relatively sharp apex in the sloped edge 15 shown in FIG. 7 and making it possible to fully conform a facing skin to this cove-contoured edge.

Advantages

One advantage of a microstep-bevelled edge in an end-grain balsa core panel is that it acts effectively to roughen the surface of this edge and therefore enhances the ability of a bonding agent such as an epoxy resin to adhere to this surface. Of greatest importance is the advantage gained by providing an angled die face in accordance with the invention whose surface is not smooth but is defined by a series of right angle microsteps, each of which in practice may have a narrow width of about 1/16 th of an inch. Had the angled die face being formed by a smooth, planar surface, then when the die is subjected to high pressure and engaged the right-angle edge of the core panel to be bevelled, the resultant horizontal component of force would split the wood just as a wedge acts to split firewood.

However, with a die whose angled face is defined by a serries of right angle microsteps, when this die face is pressed to engage the edge of the end-grain balsa panel, the microsteps then exert forces parallel to the end grain of the panel. Hence the microstepped die face generates no horizontal force component that would cause the end grain panel to split.

As previously indicated, bevelling the edges of the end grain core panel makes it possible to laminate facing skins thereto which cannot be sharply bent, yet can be made to conform to the gentle slope of the bevelled edge. This gentle slope gives rise to another advantage, for the resultant grandual transition from a cored laminate whose edge has a gentle slope to an uncored solid laminate beyond the sloped edge reduces stress risers. These stress risers would occur had there been an abrupt transition from a core to an uncored laminate, as with a core panel having a right angle edge.

While there have been shown preferred embodiments of a balsa core laminate having bevelled edges in accordance with the invention, it will be appreciated that many changes may be made therein without departing from the spirit of the invention.

I claim:

1. A structural laminate comprising:

A. an end-grain balsa core panel having an internal structure formed by substantially parallel cellular columns, said panel having an upper face at least one edge of which is bevelled to impart a gentle slope thereto, the surface of said edge having a staircase formation defined by a series of right angle microsteps; and B. a facing skin adhesively laminated to said upper face of said panel and to said edge, said facing skin being incapable of being sharply bent, but being bent to fully conform to said sloped edge.

2. A laminate as set forth in claim 1, in which the facing skin is a composite sheet that incorporates reinforcing fibers.

3. A laminate as set forth in claim 2, in which the fibers are graphite fibers.

4. A laminate as set forth in claim 2, in which the fibers are glass fibers.

5. A laminate as set forth in claim 1, in which said staircase formation runs along a straight line to define an edge having a triangular apex.

6. A laminate as set forth in claim 1, in which the cellular columns included in each of said microsteps are collapsed to an extent depending on the position of the microstep in the staricase.

7. A laminate as set forth in claim 1, in which said staircase formation runs along a curved line to define a contoured edge.

* * * * *